United States Patent
Rohde

(10) Patent No.: US 7,720,064 B1
(45) Date of Patent: May 18, 2010

(54) METHOD AND SYSTEM FOR PROCESSING NETWORK AND STORAGE DATA

(75) Inventor: Derek Rohde, Roseville, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 220 days.

(21) Appl. No.: 11/963,566

(22) Filed: Dec. 21, 2007

(51) Int. Cl.
*H04L 12/28* (2006.01)
*H04J 3/16* (2006.01)
*G06F 13/14* (2006.01)
*G06F 13/36* (2006.01)

(52) U.S. Cl. .................................. 370/389; 370/469
(58) Field of Classification Search ................. None
See application file for complete search history.

(56) References Cited

U.S. PATENT DOCUMENTS

| | | | |
|---|---|---|---|
| 5,937,169 A * | 8/1999 | Connery et al. | 709/250 |
| 6,470,397 B1 * | 10/2002 | Shah et al. | 709/250 |
| 7,197,576 B1 * | 3/2007 | Lo et al. | 710/2 |
| 7,515,612 B1 * | 4/2009 | Thompson | 370/474 |
| 2005/0273672 A1 * | 12/2005 | Konda et al. | 714/45 |
| 2006/0064531 A1 * | 3/2006 | Alston et al. | 710/308 |
| 2007/0263629 A1 * | 11/2007 | Cornett et al. | 370/392 |
| 2009/0052461 A1 * | 2/2009 | Brown et al. | 370/401 |

* cited by examiner

*Primary Examiner*—Chirag G Shah
*Assistant Examiner*—Jenkey Van
(74) *Attorney, Agent, or Firm*—Klein, O'Neill & Singh, LLP

(57) ABSTRACT

Method and system for transmitting data using a network protocol and a storage protocol via an adapter is provided. The method includes receiving an input output control block (IOCB) from a host system for transferring data stored in a host system memory; acquiring data from the host system memory; copying a header template in a local memory of the adapter, wherein the header template is created by a driver executed by the host system; creating a header for the network protocol and a header for the storage protocol; wherein a first module for the adapter creates the network protocol packet header and the first modules uses an assist module to create the storage protocol packet header; and creating a packet to transfer a portion of the acquired data, wherein a packet size is based on a payload size for the storage.

20 Claims, 7 Drawing Sheets

| Ethernet Header 302 | FCOE Header 304 | SOF 306 | FC Header 308 | Pay Load 310 | CRC 312 | EOF 314 | Ethernet CRC 316 |

300

| | |
|---|---|
| FCOE Sequence offload | 602 |
| Perform Sequence packetization | 604 |
| Perform FC based CRC | 606 |
| Data transfer length | 608 |
| FC Frame Payload size | 610 |
| Memory address where data is stored | 612 |
| Header Type | 614 |
| Header Size | 616 |

600

METHOD AND SYSTEM FOR PROCESSING NETWORK AND STORAGE DATA

BACKGROUND

1. Technical Field

This disclosure relates in general to networking systems, and more particularly, to processing network data and storage data in network systems.

2. Related Art

Networking systems are commonly used to move network information (may also be referred to interchangeably, as frames, packets or commands) between computing systems (for example, servers) or between computing systems and network devices (for example, storage systems). Various hardware and software components are used to implement network communication.

Different protocols, (e.g., Ethernet, Fibre channel, iSCSI, and the like) may be used to handle network information and storage information. Each protocol has its own advantages in specific application class. Typically, a networking application may use the Ethernet protocol to handle network communication while a storage application may use the Fibre channel protocol to send and receive data from a storage area network (SAN). It is desirable to use a consolidated system, which would allow storage traffic (e.g. Fibre Channel frames) to be transmitted via a network protocol (e.g. Ethernet).

SUMMARY

In one embodiment, a method for transmitting data using a network protocol and a storage protocol via an adapter is provided. The method includes receiving an input output control block (IOCB) from a host system for transferring data stored in a host system memory, wherein the adapter receives the IOCB and determines if an offload operation is to be performed; acquiring data from the host system memory, wherein the adapter acquires the data from the host system based on a memory address embedded in the IOCB; copying a header template in a local memory of the adapter, wherein the header template is created by a driver executed by the host system; creating a header for the network protocol and a header for the storage protocol; wherein a first module for the adapter creates the network protocol packet header and the first module uses an assist module to create the storage protocol packet header; creating a packet to transfer a portion of the acquired data, wherein a packet size is based on a payload size for the storage; and transmitting data packets until a sequence offload is complete.

In another embodiment, a system for transmitting data using a network protocol and a storage protocol is provided. The system includes a driver executed in a host system creates a header template for each sequence for transferring the data and partially executes functions related to the storage protocol; and an adapter coupled to the host system and a network link, the adapter (a) copies the data and the header template from a host system memory to a local adapter memory; (b) creates a header for the network protocol using a network processing module and a header for the storage protocol using a storage assist module, (c) creates individual packets whose size are limited by a payload size indicated by an input and output control block received from the host system; and (d) transmits the packets to a destination via a network interface using, the network link.

In yet another embodiment, an adapter or transmitting data using a network protocol and a storage protocol is provided. The adapter includes an interface for communicating with a host system that executes a driver for creating a header template for each sequence for transferring the data and the driver partially executes functions related to the storage protocol; a core module that copies the data and the header template from a host system memory to a local adapter memory; and creates a header for the network protocol; and a storage protocol assist module that creates a header for the storage protocol and interfaces with the core module; wherein the core module creates individual packets whose size are limited by a payload size indicated by an input and output control block received from the host system; and transmits the packets to a destination via a network interface using a network link.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

It should be understood that the techniques of the present disclosure described below may be implemented using various technologies. For example, methods described herein may be implemented in firmware executed by a processor or state machine, or implemented in hardware using either a combination of processor or other specially designed application specific integrated circuits, programmable logic devices, or various combinations thereof.

To facilitate an understanding of the various embodiments, the general architecture and operation of a network system will first be described. The specific architecture and operation of the various embodiments will then be described with reference to the general architecture of the network system.

Network System

Figure 1:
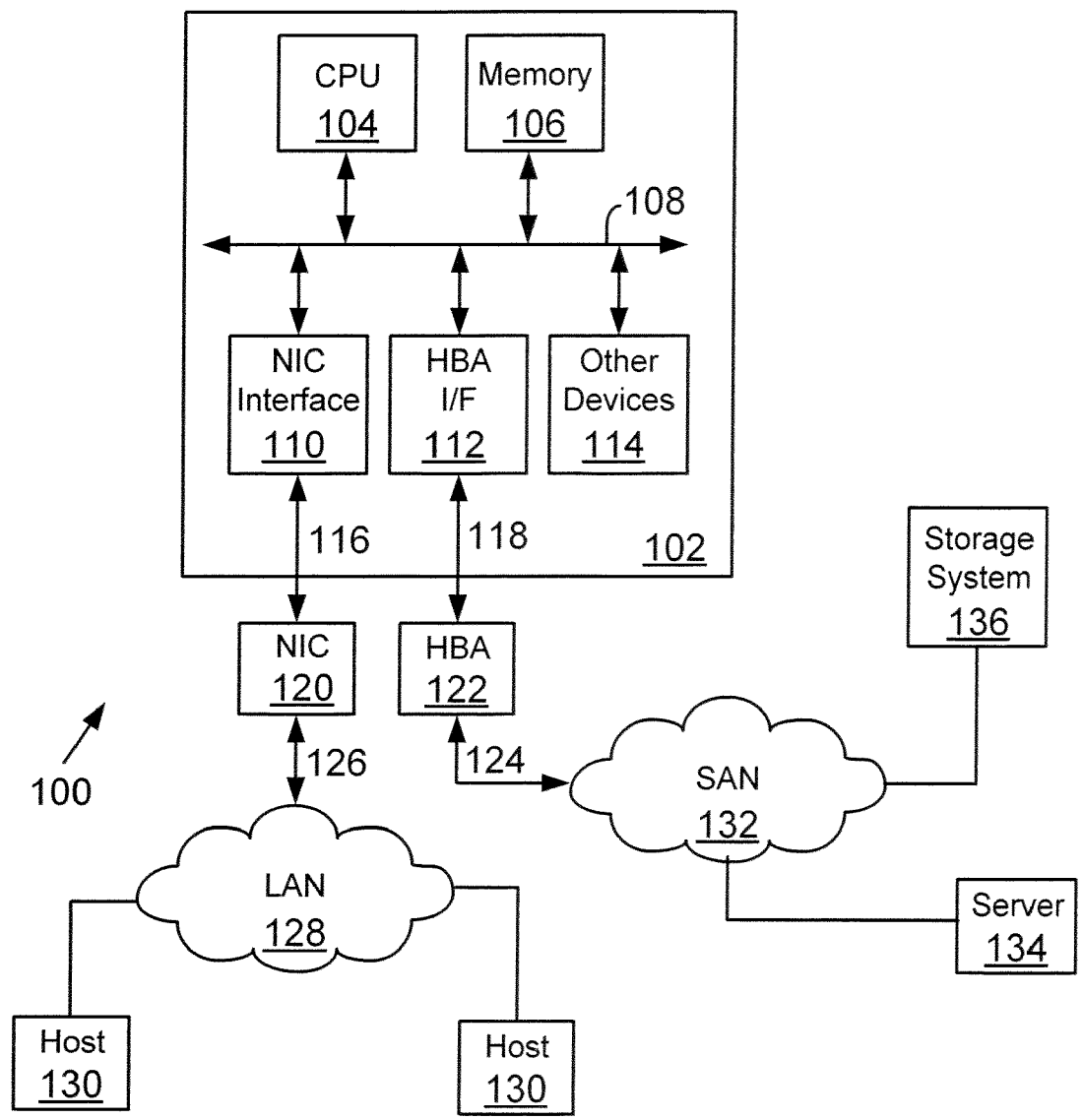
FIG. 1 shows a block diagram of a network system, according to one embodiment.

FIG. 1 shows a block diagram of a generic network system 100, which includes a conventional computing system 102 that can communicate with a plurality of network devices and storage devices. Computing system 102 typically includes several functional components. These components may include a central processing unit (CPU) 104, main memory 106, network interface (NIC Interface) 110, a host bus adapter (HBA) interface (HBA I/F) 112 and other devices (for example, input/output ("I/O") devices) 114.

In computing system 102, the main memory 106 is coupled to the CPU 104 via a system bus 108 or a local memory bus (not shown). The main memory 106 is used to provide the CPU 104 access to data and/or program information that is stored in main memory 106 at execution time. Typically, the main memory 106 is composed of random access memory (RAM) circuits. A computer system with the CPU and main memory is often referred to as a host system.

Network interface 110 is coupled to a network interface card 120 via a bus/link 116 (used interchangeably throughout this specification). NIC 120 handles incoming (receive) and outgoing (transmit) network traffic computing system 102 via link 126. The term incoming means network traffic that is received by NIC 120 (for example, from another host system 130 coupled to a local area network (LAN) 128). The term outgoing means network traffic that is transmitted by NIC 120 for computing system 102 to another network device (e.g. host system 130).

Various network protocols may be used by NIC 120 to handle network traffic. One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol, however, the adaptive embodiments disclosed herein are not limited to any particular protocol, as long as the functional goals are met by an existing or new network protocol.

Host system 102 also uses HBA 122 to communicate with storage systems, for example, 136 coupled to a storage area network (SAN) 132. Link 124 couples HBA 122 to SAN 132. The transfer rate for link 124 continues to increase for example, from 1 Gb to 10 Gb.

In SANs (for example, 132), plural memory storage devices are made available to various host computing systems. Data in a SAN is typically moved between plural host systems and storage systems (or storage devices (e.g. server 134), used interchangeably throughout this specification) through various controllers/adapters, for example, HBA 122.

One common standard that is used to access storage systems in a SAN is Fibre Channel. Fibre channel is a set of American National Standard institute (ANSI) standards, which provide a serial transmission protocol for storage and network protocols such as HIPPI, SCSI, IP, ATM and others.

Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

Host systems often communicate with peripheral devices (for example, HBA 122 via bus 118) via an interface/bus such as the Peripheral Component Interconnect ("PCI") interface, PCI-X and/or PCI-Express (incorporated herein by reference in its entirety) bus.

One challenge faced by conventional network systems is efficiently processing a storage packet (for example, Fibre Channel and a network packet (for example, an Ethernet packet. Currently network systems typically use separate NICs and HBAs (for example, 120 and 122) to send and receive network and storage traffic. These separate NICs and HBAs use complex software code, which makes the use of storage and network protocols expensive and cumbersome. The various embodiments disclosed herein overcome these shortcomings by efficiently processing FIBRE CHANNEL and Ethernet frames.

A new and upcoming standard, called Fibre Channel Over Ethernet (FCOE) is being proposed that intends handle both Ethernet (network) and Fibre Channel (storage) traffic. The current solutions for implementing the standard are not commercially desirable. For example, one proposed solution is to use a Fibre Channel host bus adapter (HBA) technique where a host system hardly does anything besides providing an I/O request and a scatter/gather list to the HBA. The FCOE HBA performs all the other I/O functions. The cost of the FCOE HBAs can prohibitive.

Another solution uses a simple network interface card (NIC) where the host implements the entire Fibre Channel stack in software. The host software performs Fibre Channel frame packetization and other I/O functionality. This solution consumes host-computing resources and tends to be slow, hence may not be commercially desirable.

The optimum solution for implementing FCOE is to use an approach that limits cost while providing optimum performance for processing both network and storage data. In one embodiment, a hybrid solution is provided, where a host performs certain functions, for example building an intelligent I/O control block (IOCB) and an ad performs packetization and other functions. This avoids the expense of a full offload to an adapter and provides better performance than a system where a host executes the entire Fibre Channel stack in software.

The adaptive aspects of the present invention, described herein are based on using the Ethernet and Fibre Channel protocols; however, any other network and storage protocol may be used to implement the various embodiments described herein.

Network/Storage Adapter

Figure 2A:
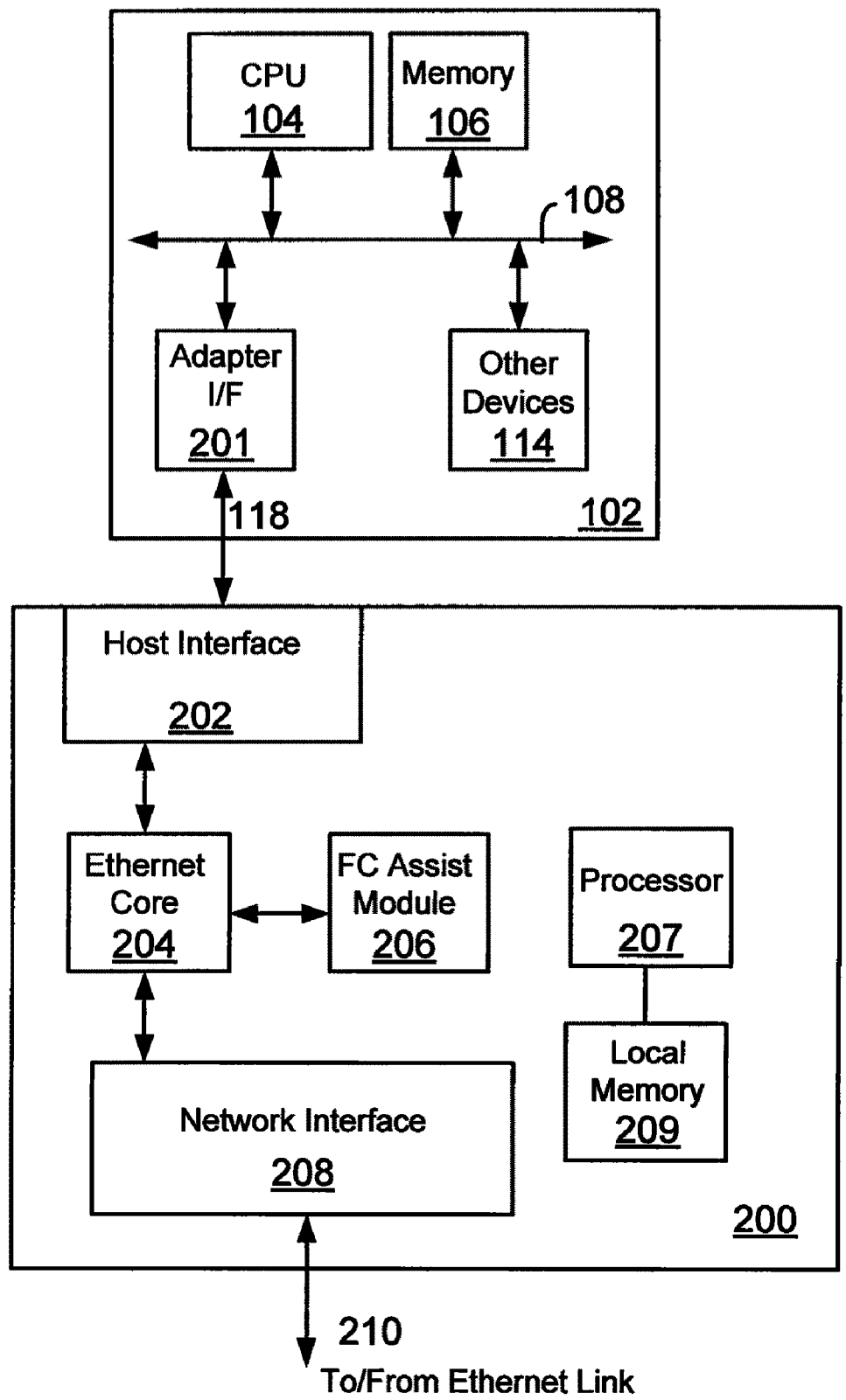
FIG. 2A shows an example of an adapter, according to one embodiment.

In one embodiment, an integrated network and storage adapter is provided that can handle both network and storage protocols. The adapter is referred to herein as a Fibre Channel over Ethernet (FCOE) adapter. FCOE adapter can process network (for example, Ethernet) and storage (for example, Fibre Channel) traffic efficiently. FIG. 2A shows a block diagram of an FCOE adapter 200, which is coupled to host system 102 via link 118 (which may be a PCI Express link, and adapter interface 201. FCOE adapter includes a processor 207 that executes firmware instructions out of memory 209 to control overall adapter 200 functionality.

FCOE adapter 200 interfaces with network 128 via network interface 208. Network interface 208 transmits and receives network packets via link 210.

FCOE adapter 200 interfaces with host system 102 via host interface 202. In one embodiment, host interface 202 is a PCI Express interface coupled to PCI Express link 118.

FCOE adapter 200 includes an Ethernet control module (also referred to as Ethernet core) 204, and a Fibre channel assist module (may also referred to as FC assist module) 206. Ethernet core 204, described below in detail with respect to FIG. 2B, processes network data received via link 210 and data received from a host system via host interface 202. The term data as used throughout this specification includes commands, primitives, signals and others.

FC assist module 206 may include a hardware state machine or logic (not shown) to interface with Ethernet Core 204. As described below, FC assist module 206 performs certain Fibre Channel functions related to incoming and outgoing Fibre Channel frames.

Ethernet core 204 with assistance from FC assist module 206 builds FCOE packets for sending data from host system 102. Although FC assist module 206 is shown as a separate module from Ethernet Core 204 for clarity purposes, FC assist module 206 may be integrated with Ethernet Core 204.

Figure 2B:
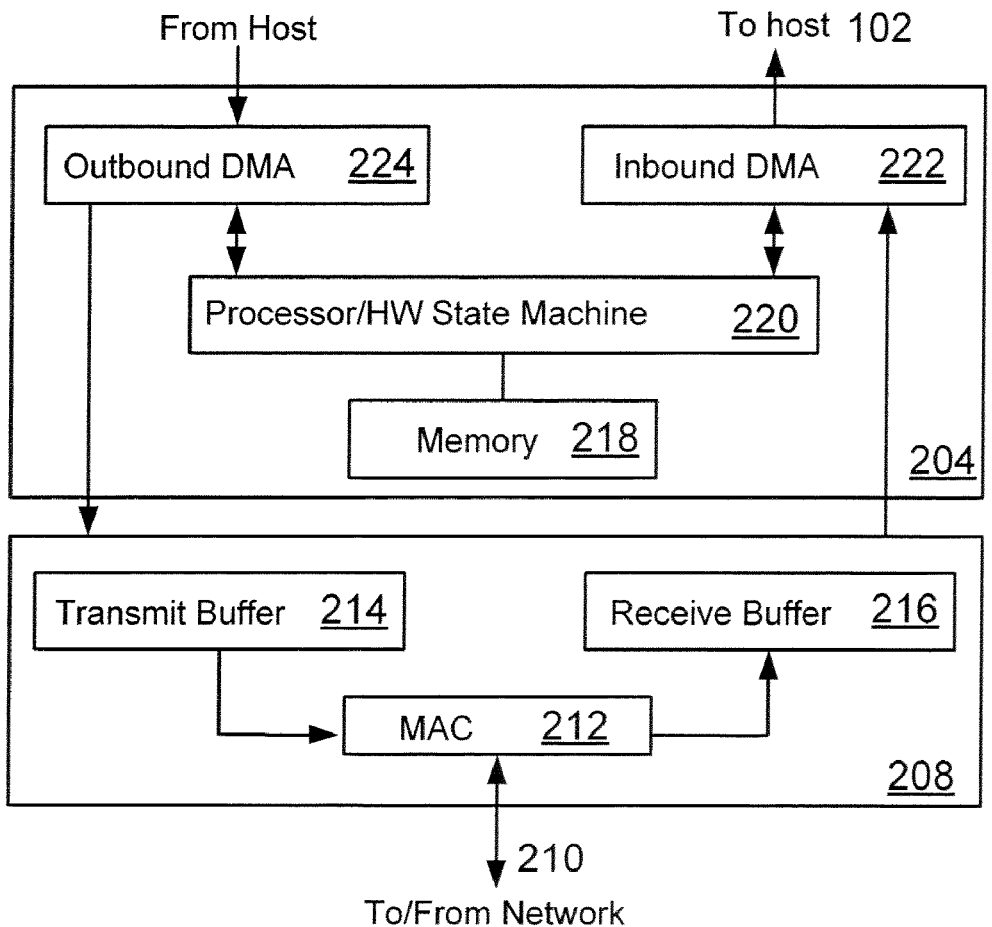
FIG. 2B shows an example of an Ethernet core used in the adapter of FIG. 2A, according to one embodiment.

Referring now to FIG. 2B, Ethernet core 204 interfaces with network interface 208 for processing network data received or transmitted via link 210. Ethernet core 204 typically includes various functional components. These components may include a processor or hardware state machine (used interchangeably throughout this specification) 220, memory 218, outbound DMA (Direct Memory Access) engine 224 and inbound DMA engine 222.

Network interface 208 includes a transmit buffer 214, a receive buffer 216 and a MAC layer (medium access control layer) 212. Receive buffer 216 stores incoming network data in a receive path and transmit buffer 218 stores outgoing transmit data in a transmit path. MAC 212 processes data received from receive buffer 216 and/or transmit buffer 214. In one embodiment, MAC layer 212 may be a standard NIC layer that handles incoming and outgoing network information.

Outbound DMA engine 224 receives data from memory 106 of host system 102 and sends the data to transmit buffer 214. Inbound DMA engine 222 moves data received from the network via link 210 to host system 102. Processor 220 controls the overall functioning of the Ethernet core 204 using data and information stored in memory 218.

When only an Ethernet packet is received via network link 210, MAC 212 sends it to inbound DMA 222 (via receive buffer 216), from where it is sent to the host system 102.

When only an Ethernet packet is received from the host system 102, the outbound DMA module 224 processes the packet and sends it to MAC layer 212 via transmit buffer 214. The Ethernet packet is then forwarded to its destination via link 210.

Ethernet core 204 also assists in handling network/storage packets. For example, when FCOE adapter 200 receives a FCOE packet via link 210, Ethernet core 204 processes the FCOE packet. Ethernet core 204 may call on FC assist module 206 to perform certain Fibre Channel related functions before passing the Fibre Channel frames (in the FCOE packet) to host system 102. In one embodiment, both storage and network packets are simultaneously processed by FCOE adapter 200.

Outgoing Fibre Channel packets are also handled by Ethernet core 204 with the assistance of FC assist module 206, as described below in more detail with respect to FIG. 5.

Figure 2C:
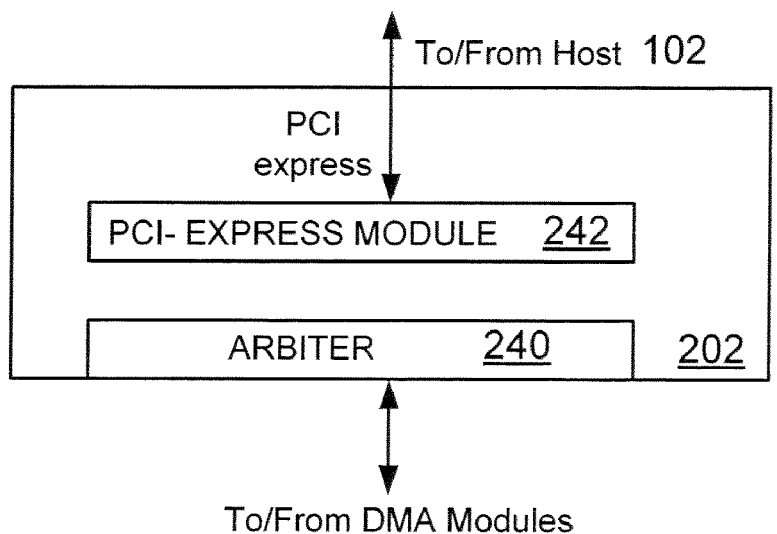
FIG. 2C shows an example of a host interface used in the adapter of FIG. 2A, according to one embodiment.

FIG. 2C is a block diagram for host interface 202 that interfaces with host system 102. Host interface 202 includes an arbiter 240 and PCI express module 242. Arbiter 240 receives requests from various DMA modules (224, 222 and others) to access bus 118 and then arbitrates between the requests. As an example, when DMA module 224 needs to access PCI-Express bus 118 it sends a request to arbiter 240. Arbiter 240 evaluates the request and if appropriate, grants the request, which enables DMA module 224 to access the PCI-Express bus 118. Arbiter 240 may use a round robin or any other scheme to evaluate DMA requests.

Figures 3, 4:
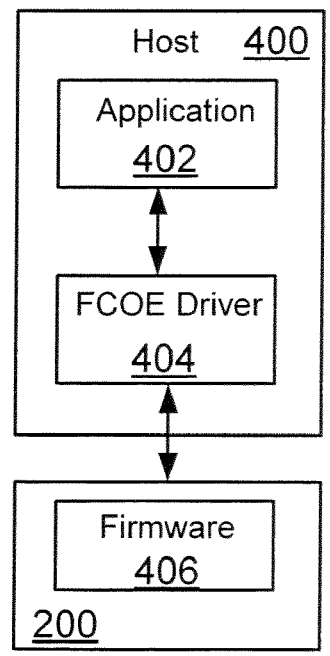
FIG. 3 shows a block diagram of a FCOE packet format, according to one embodiment.
FIG. 4 shows a top level software architecture for handling network and storage information, according to one embodiment.

FCOE Packet Format:

FIG. 3 shows an example of an FCOE packet format 300 for processing network and storage traffic. FCOE packet 300 includes an Ethernet header 302. In one embodiment, the Ethernet header 302 may be 14 bytes in length. FCOE packet also includes a FCOE header 304 that includes the Ethernet type and version information. Start of frame (SOF) 306 indicates the beginning of a frame and may be 1 byte.

FCOE packet 300 may also includes a Fibre Channel header (FC Header) 308 that may be 24 bytes long with payload 310. The Fibre Channel cyclic redundancy code (CRC) 312 may be 4 bytes and the end of frame (FOE) 42 may be 1 byte in size. EOF 314 indicates the end of a frame. Ethernet CRC 316 is inserted after EOF 314.

Overall Software Architecture:

FIG. 4 shows a top-level software architecture that may be used for handling FCOE packets. Operating system 400 may be executed at a host system (for example, 102). Application 402 initiates storage-based commands (for example, to write or read data) that are sent to the FCOE adapter 200 via a FCOE driver 404 that is executed at the host system. Firmware 406 controls overall functioning of FCOE adapter 200 and is executed by processor 207.

In one embodiment, the FCOE driver 404 performs certain Fibre Channel related functions, without, executing the entire Fibre Channel software stack. For example, the FCOE driver may perform functions related to Fibre Channel Exchange management; Fibre Channel stack (for example, FC-3 and FC-4 layer processing) and Fibre Channel Fabric management operations, for example, the PLOGI, the FLOGI, Node Discovery and other operations.

FCOE driver 404 also places data received from the network in defined user space buffers; creates a header template for each Sequence that is to be offloaded/transmitted; and creates a scatter/gather list of buffers of data to be transmitted. FCOE driver 404 further creates a Fibre Channel Sequence for data to be transmitted. FCOE driver 404 may not build individual frames for each sequence because that function is offloaded to the FCOE adapter 200.

In one embodiment, the present disclosure provides an optimum solution for handling FCOE packets. Instead a complete software solution where the host driver performs all the functions or an expensive FCOE adapter that performs most of the Ethernet and Fibre Channel related functions, a hybrid solution is provided. In the hybrid solution, the FCOE driver 404 and the FCOE adapter 200 using the FC assist module 206 perform the Fibre Channel functions. The Ethernet core 204 of the FCOE adapter 200 handles most of the Ethernet related functions and also interfaces with the FC assist module 206.

Figure 5:
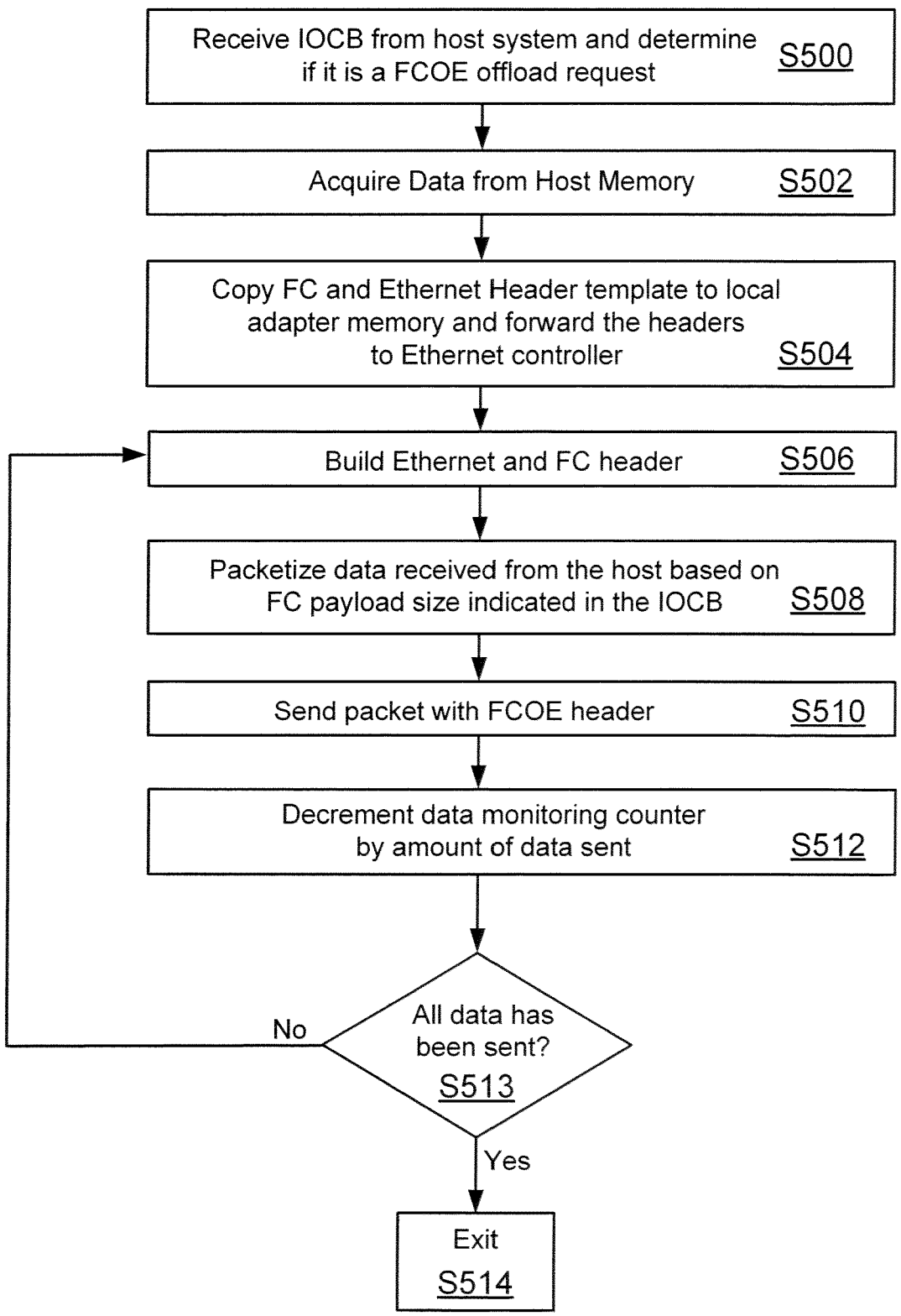
FIG. 5 shows a process flow diagram for processing storage and network data, according to one embodiment.

FIG. 5 shows a process flow diagram for transmitting FCOE packets via FCOE adapter 200, according to one embodiment. The process start in step S500, when host system 102 builds an input output control block (IOCB) (for example, IOCB 600, FIG. 6) and forwards the IOCB to FCOE adapter 200. FCOE adapter 200 determines if the IOCB includes a FCOE header and needs to perform any offload functions. The IOCB may include flags (or fields) that indicate to the FCOE driver 404 (and to the FCOE adapter 200) that offload operations need to be performed.

Figures 6A, 7:
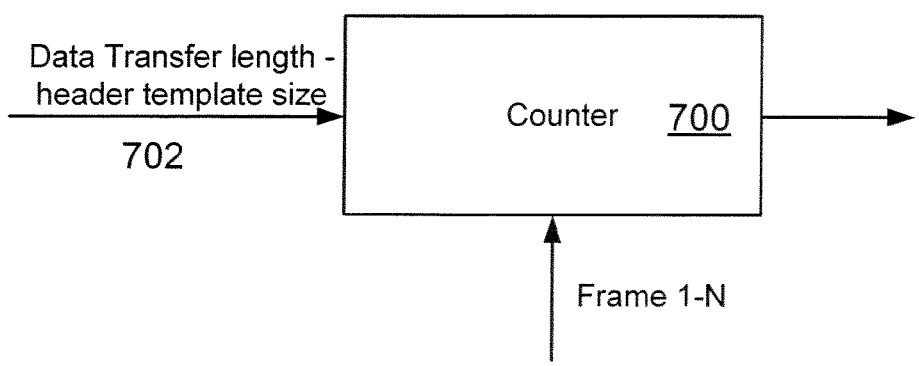
FIG. 6A shows an example of an input/output control block (IOCB), according to one embodiment.
FIG. 7 shows an example of a counter mechanism used for monitoring transmission of data packets, according to one embodiment.

FIG. 6A shows an example of an IOCB 600 with a plurality of fields that are set by host system 102. IOCB 600 includes information for a FCOE offload sequence (602) which means that some offload (or FCOE) processing is to be performed by FCOE adapter 200.

IOCB may also include a field 604 indicating that sequence packetization is to be performed; and field 606 indicating that only Fibre Channel based CRC calculation (606) is to be performed. IOCB further includes information about the amount of data that needs to be transferred (data transfer length 608), and the Fibre Channel frame payload size 640. IOCB may also include a list of memory addresses (612) where data that is to be transmitted is stored in host memory. Field 614 is used to indicate the header type (i.e. if it is FCOE header) and field 616 provides header size.

If a FCOE header is received in step S500 for an offloaded FCOE sequence, then the process moves to step S502. In step S502, FCOE adapter 200 acquires data from host memory 106. Outbound DMA module 224 may be used to acquire the data.

Figure 6B:
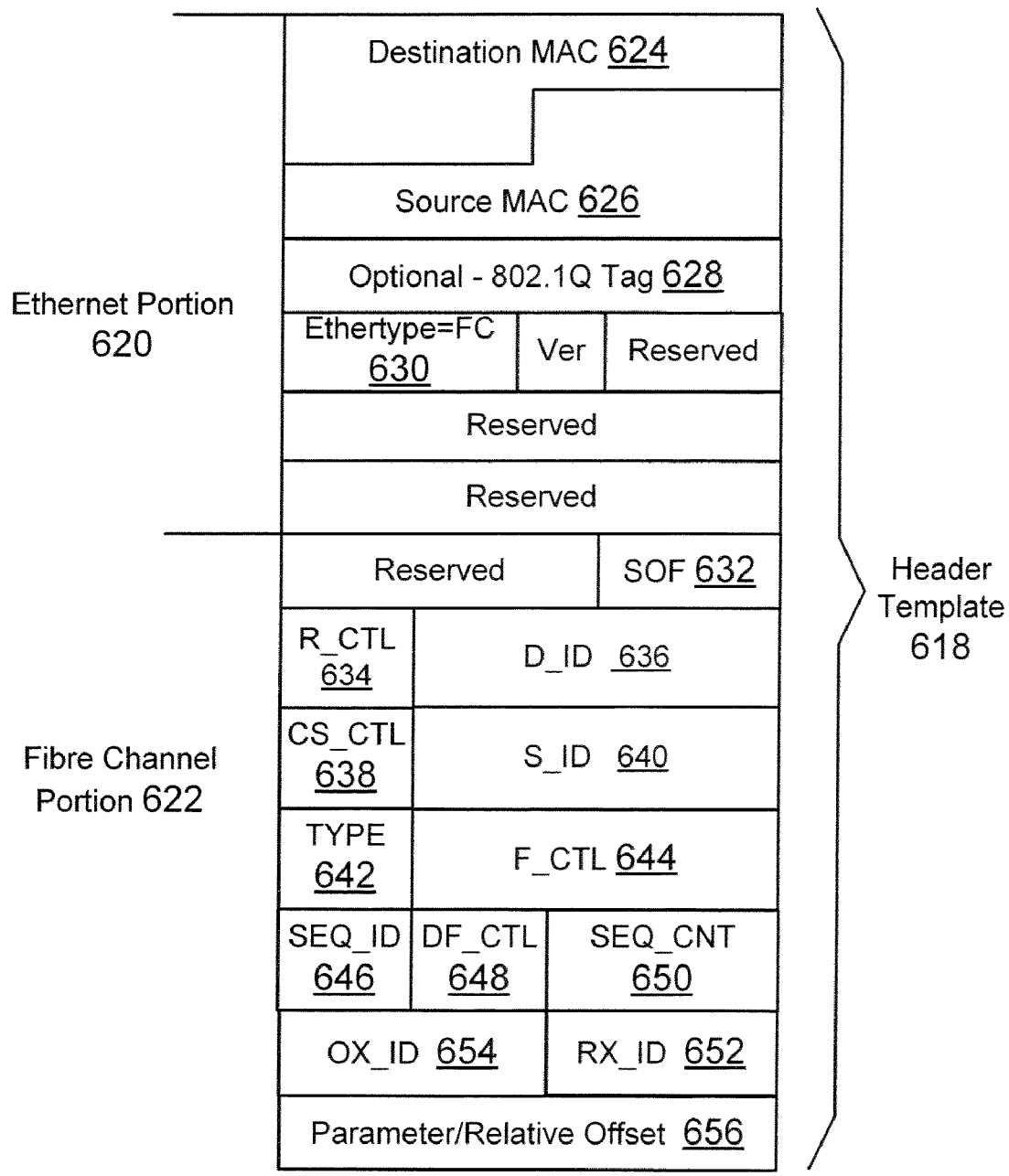
FIG. 6B shows an example of a header created by a host system for a FCOE offload operation, according to one embodiment.

In step S504, an Ethernet and Fibre Channel header template is copied to memory 218 in Ethernet core forwarded to MAC layer 212. The Ethernet core 204 uses the header template to create an FCOE packet. FIG. 6B shows an example of a header template 618 that is created by the host system 102.

Header template 618 includes an Ethernet portion 620 and a Fibre Channel portion 622. Ethernet portion 620 includes a destination MAC address 624, a source MAC address 626, optional field 628 and a field 630 indicating the frame type.

Fibre Channel portion 622 includes various Fibre Channel fields including start of frame (SOF) 632, R_CTL 634, D_ID 636, CS_CTL 638, S_ID 640, Type 642, F_CTL 644, SEQ_ID 646, DF_CTL 648, SEQ_CNT 650, OX_ID 654, RX_ID 652 and a parameter/relative offset value 656. The various Fibre Channel fields are defined by the Fibre Channel specifications. For example, R_CTL 634 is a field for routing control; D_ID 636 is a destination address of an Nx_Port; CS_CTL 638 is a field for class control; S_ID 640 is an address of a source Nx_Port of a transmitted frame; TYPE 642 indicates the frame type; F_CTL 644 is a field used for frame control; and SEQ_ID 646 identifies sequence for exchanging Fibre Channel frames. DF_CTL 648 is a field for data field control; SEQ_CNT 650 is a field for a sequence count, OX_ID 654 is an identifier assigned by an originator to identify an Exchange and RX_ID 652 is an identifier assigned by a responder identify an Exchange.

The host system sets the SOF field 632 (similar to SOF 304, FIG. 3) to indicate if the data (provided by the host system) is an entire Fibre channel sequence or just a portion of a Fibre channel sequence.

In step S506, Ethernet core 204 builds an Ethernet header (including the FCOE header) and a Fibre Channel header (with assistance from FC assist module 206). The headers (Ethernet 302, FCOE 304 and Fibre Channel 308) are used for FCOE packets, an example of which is shown in FIG. 3.

In one embodiment, the Ethernet header may be built entirely by the Ethernet core 204. Ethernet MAC header 302 fields are copied from the header template 618.

Ethernet core 204 by itself or with the assistance of FC assist module 206 also builds the Fibre Channel header 304. For example, FC assist module 206 may insert an offset value for an FC header for each FCOE packet. The offset value may be used to distinguish the Fibre Channel packets.

The offload data provided by the host system may be for an entire Fibre Channel sequence or for just a portion thereof. The offload data may be located at the start, middle or end of the Fibre Channel sequence. If the offload is at a start of a sequence, the host system indicates that by setting SOF field 306 (FIG. 3) to a code corresponding to SOFiX field for a particular class service. The host system may set the SOF field 306 to SOFnX, if the offload is not at the beginning of a sequence. For a first frame, the SOF value is copied from header template 618. For each subsequent frame, the SOFnX for a particular class of service may be inserted.

During step S506, to build the Fibre Channel header 308, the R_CTL 634, D_ID 636, CS_CTL 633, S_ID 640, OX_ID 654, RX_ID 652 and TYPE fields 642 are copied from template 618. Parameter fields are appropriately set to ensure there is no data loss.

To build the F_CTL field 644 for each packet, all bits may be copied from header template 618, except an End Sequence bit and a Sequence Initiative bit. If the host system sets an End Sequence bit in F_CTL field 644, it indicates that a last frame of the sequence is included in the offload. When the End Sequence bit is set by the host, Ethernet core 204 (or FC assist module 206) uses the bit only for last packet and clear the bit for other packets. If a Sequence Initiative bit (which is a part of F_CTL field 644) and the End Sequence bit are set in header template 618, then the Sequence Initiative bit (along with the End Sequence bit) is set only in the last frame.

For each frame header, the SEQ_ID 646 and DF_CTL 648 fields are also copied from the header template 618. The SEQ_CNT field 650 is copied from the header template 618 to the Fibre Channel header 308 (FIG. 3) of the first frame built for an offload operation. The SEQ_CNT field is then incremented and copied into the header of each subsequent frame. The FC assist module 206 may perform this function.

If the Relative Offset Present bit 656 (which indicates that the relative offset is present) in the F_CTL field 644 is clear, then the Parameter fields are copied from the header template 618 to each frame header in a sequence. If the Relative Offset Present bit was set, then the host also sets the Parameter/Relative Offset field to an initial value and this initial value is copied to the frame header.

Ethernet core 204 (and/or FC assist module 206) determines the Fibre Channel CRC 312 for each packet. Following the FC CRC 312 is the EOF field 314. Ethernet core 204 sets the EOF field 314 to EOFn for all the frames in a sequence. After the EOF field 314, Ethernet CRC 316 is inserted by network interface 208 to complete a FCOE packet In step S508, after the headers are created, the data received from host memory is packetized based on the indicated Fibre Channel payload size in IOCB 600. If data payload 310 is less than a certain size, for example, 11 bytes, then Ethernet core 204 pads the payload 310 to meet a minimum payload size.

In step S510, an FCOE packet is sent and in step S512, a counter 700 is decremented (or decreased) by an amount of data in the transmitted packet. Counter 700 (as shown in FIG. 7) is a data-monitoring counter maintained in Ethernet core 204. Counter 700 is initially loaded with data, which is equal to the data transfer length (608) from IOCB 600 minus the size of header template 616. As each frame is created and forwarded, the counter is decremented by the amount of transmitted data. Thus when all the data is transmitted counter 700 value is zero.

In step S513, FCOE adapter 200 determines if all the data has been sent. If all the data is not sent, then the process moves back to step S504. If all the data has been sent, then the process ends in step S514.

In one embodiment, the present disclosure provides an optimum, hybrid solution to handle storage and network traffic. A host driver and an adapter share the workload in processing the network and storage packets. Instead of having a complex host driver or an expensive adapter for performing a complete offload; the host driver and the adapter efficiently split the operations.

Although the present invention has been described with reference to specific embodiments, these embodiments are illustrative only and not limiting. For example, although the foregoing examples are based on Ethernet and Fibre Channel protocols, the adaptive embodiments may be applied to any network and storage protocol. Many other applications and embodiments of the present invention will be apparent in light of this disclosure and the following claims.

What is claimed is:

1. A method for transmitting data using a network protocol and a storage protocol via an adapter, comprising:
    receiving an input output control block (IOCB) from a host system for transferring data stored in a host system memory, the IOCB including a field indicative of offload processing to be performed by the adapter, wherein the adapter receives the IOCB;
    determining if the offload processing operation is to be performed by the adapter based upon the field indicative of offload processing;
    acquiring data from the host system memory, wherein the adapter acquires the data from the host system based on a memory address embedded in the IOCB;
    copying a header template from the host system memory to a local memory of the adapter, wherein the header template is created by a driver executed by the host system;
    using the copied header template, creating a header for the network protocol and a header for the storage protocol;
    wherein a first module for the adapter creates the network protocol packet header and the first module uses an assist module to create the storage protocol packet header;
    creating a packet to transfer a portion of the acquired data, wherein a packet size is based on a payload size for the storage protocol indicated by a field in the IOCB; and
    transmitting data packets until a sequence offload is complete.

2. The method of claim 1, further comprising:
    decrementing a data monitoring counter every time a packet is sent.

3. The method of claim 2, further comprising:
    sending data packets until the data monitoring counter indicates that all the packets have been transmitted.

4. The method of claim 1, wherein the adapter is a Fibre Channel over Ethernet (FCOE) adapter.

5. The method of claim 4, wherein the network protocol is Ethernet and the storage protocol is Fibre Channel.

6. The method of claim 4, wherein the first module is an Ethernet core and the assist module is a Fibre Channel assist module.

7. The method of claim 4, wherein the adapter creates FCOE packets that are trans-mitted over an Ethernet network link.

8. The method of claim 2, wherein the data monitoring counter is maintained by the adapter.

9. A system for transmitting data using a network protocol and a storage protocol, comprising:
    a host system, the host system creates an input output control block (IOCB) to transfer data stored in the host system memory, the IOCB including a field indicative of offload processing to be performed by an adapter coupled to the host system;
    a driver executed in the host system creates a header template for each sequence for transferring the data; and
    the adapter coupled to a network link, the adapter (a) receives the IOCB from the host system and determines if the offload processing operation is to be per-formed based upon the field indicative of offload processing; (b) copies the data and the header template from the host system memory to a local adapter memory; (c) uses the copied header template and creates a header for the network protocol using a network processing module and a header for the storage protocol using a storage assist module, (d) creates individual packets whose size are limited by a payload size indicated by a field in the IOCB; and (e) transmits the packets to a destination via a network interface using the network link.

10. The system of claim 9, wherein the adapter maintains a data monitoring counter, which is decremented every time a packet is sent via a network link and data packets are sent until the data monitoring counter indicates that all the packets have been transmitted.

11. The system of claim 9, wherein the adapter is a Fibre Channel over Ethernet (FCOE) adapter.

12. The system of claim 11, wherein the network protocol is Ethernet and the storage protocol is Fibre Channel.

13. The system of claim 11, wherein the first module is an Ethernet core and the assist module is a Fibre Channel assist module.

14. The system of claim 11, wherein the adapter creates FCOE packets that are transmitted over an Ethernet network link.

15. An adapter for transmitting data using a network protocol and a storage protocol, comprising:
    an interface for communicating with a host system that is configured to create an input output control block (IOCB) to transfer data stored in the host system memory, the IOCB including a field indicative of offload processing to be performed by the adapter and executes a driver for creating a header template for each sequence for transferring the data;
    a core module that copies the data and the header template from the host system memory to a local adapter memory; and creates a header for the network protocol, using the copied header template; and
    a storage protocol assist module that creates a header for the storage protocol, using the copied header template and interfaces with the core module; wherein the core module creates individual packets whose size are limited by a payload size indicated by a field in the IOCB; and transmits the packets to a destination via a network interface using a network link.

16. The adapter of claim 15, wherein a data monitoring counter maintained by the adapter is decremented every time a packet is sent via the network link and data packets are sent until the data monitoring counter indicates that all the packets have been transmitted.

17. The adapter of claim 15, wherein the adapter is a Fibre Channel over Ethernet (FCOE) adapter.

18. The adapter of claim 17, wherein the network protocol is Ethernet and the storage protocol is Fibre Channel.

19. The adapter of claim 17, wherein the core module is an Ethernet core and the assist module is a Fibre Channel assist module.

20. The adapter of claim 17, wherein the adapter creates FCOE packets that are trans-mitted over an Ethernet network link.

* * * * *

UNITED STATES PATENT AND TRADEMARK OFFICE
CERTIFICATE OF CORRECTION

PATENT NO. : 7,720,064 B1  Page 1 of 1
APPLICATION NO. : 11/963566
DATED : May 18, 2010
INVENTOR(S) : Derek Rohde et al.

It is certified that error appears in the above-identified patent and that said Letters Patent is hereby corrected as shown below:

In column 1, line 65, delete "or" and insert -- for --, therefor.

In column 4, line 10, delete "Channel" and insert -- Channel frame) --, therefor.

In column 4, line 40, delete "ad" and insert -- adapter --, therefor.

In column 4, line 59, delete "adapter" and insert -- adapter 200 --, therefor. (2nd occurrence)

In column 6, line 17, delete "(FOE)" and insert -- (EOF) --, therefor.

In column 6, line 30, delete "without," and insert -- without --, therefor.

In column 7, line 9, delete "640." and insert -- 610. --, therefor.

In column 7, line 13, delete "provides" and insert -- provides the --, therefor.

In column 7, line 20, delete "core" and insert -- core 204 and --, therefor.

In column 7, line 44, delete "responder" and insert -- responder to --, therefor.

In column 9, line 50, in claim 7, delete "trans-mitted" and insert -- transmitted --, therefor.

In column 10, line 1, in claim 9, delete "per-formed" and insert -- performed --, therefor.

In column 10, line 61, in claim 20, delete "trans-mitted" and insert -- transmitted --, therefor.

Signed and Sealed this

Twelfth Day of October, 2010

David J. Kappos
*Director of the United States Patent and Trademark Office*